United States Patent [19]
Sato

[11] Patent Number: 5,708,596
[45] Date of Patent: Jan. 13, 1998

[54] FILTER CIRCUIT

[75] Inventor: Shigeo Sato, Funabashi, Japan

[73] Assignee: Uniden Corporation, Tokyo, Japan

[21] Appl. No.: 632,784

[22] Filed: Apr. 15, 1996

[30] Foreign Application Priority Data

Jan. 30, 1996 [JP] Japan ................................. 8-014684

[51] Int. Cl.$^6$ ......................................... G06F 17/10
[52] U.S. Cl. ........................................ 364/724.01
[58] Field of Search ..................... 364/724.01, 724.16;
358/133; 375/371; 318/621; 348/222; 360/77.14;
307/520; 341/61

[56] References Cited

U.S. PATENT DOCUMENTS

| | | | |
|---|---|---|---|
| 4,517,596 | 5/1985 | Suzuki | 358/133 |
| 4,961,014 | 10/1990 | Kasahara | 307/520 |
| 5,122,718 | 6/1992 | Sawata | 318/621 |
| 5,191,334 | 3/1993 | Yasuda | 341/61 |
| 5,222,035 | 6/1993 | Nakase et al. | 364/724.16 |
| 5,359,473 | 10/1994 | Kaniwa et al. | 360/77.14 |
| 5,408,266 | 4/1995 | Lleyama et al. | 348/222 |
| 5,440,503 | 8/1995 | Maruyama | 364/724.1 |
| 5,535,252 | 7/1996 | Kobayasi | 375/371 |

FOREIGN PATENT DOCUMENTS

| | | | |
|---|---|---|---|
| 60-51018 | 3/1985 | Japan | H03H 17/06 |
| 62-157416 | 7/1987 | Japan | H03H 17/06 |
| 3-201616 | 9/1991 | Japan | H03H 17/02 |
| 4-48810 | 2/1992 | Japan | H03H 17/02 |
| 4-151909 | 5/1992 | Japan | H03H 17/02 |
| 6-69760 | 3/1994 | Japan | H03H 17/02 |

*Primary Examiner*—Reba I. Elmore
*Assistant Examiner*—Monica Lewis
*Attorney, Agent, or Firm*—Lowe, Price, LeBlanc & Becker

[57] ABSTRACT

A filter circuit comprises a 1-bit quantizer, a first moving average type of filter having an N-dimensional 1-bit delay element operating in synchronism to a clock of a first sampling frequency, a thinning circuit for thinning an output from the first moving average type of filter in synchronism to a clock of a second sampling frequency, and a second moving average type of filter having an M-order q-bit delay element operating in synchronism to a clock of a second sampling frequency, wherein the thinning circuit removes anti-alias elements in the second moving average type of filter.

15 Claims, 6 Drawing Sheets

FILTER CIRCUIT

FIELD OF THE INVENTION

The present invention relates to a filter circuit, and more particularly to a filter circuit suited to be incorporated in a device such as a pager or pocket bell (selective call receiver).

BACKGROUND OF THE INVENTION

Figure 1A:
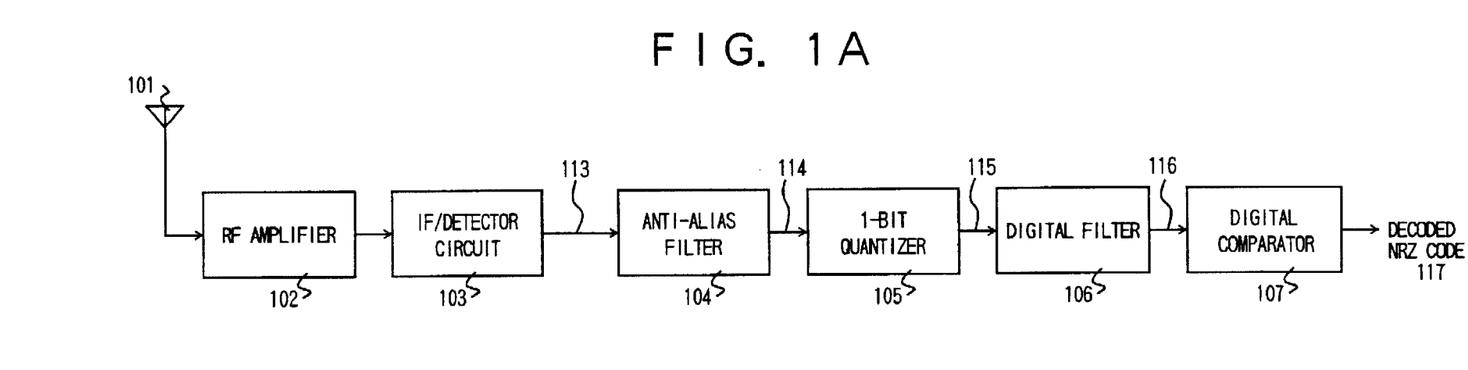
FIG. 1A is a block diagram showing a selective call receiver to which a filter circuit according to the present invention is applied.

FIG. 1A is a block diagram showing a selective call receiver (as shown in Example 1 of the conventional technology) in which the conventional type of digital signal system is used. In the selective call receiver as shown in Example 1 of the conventional technology, an electric wave obtained by subjecting a base band signal to FM modulation is received by an antenna 101, amplified in an RF amplifier 102, and then converted to an intermediate frequency by an IF/detector circuit 103, and a resultant base band signal, having been obtained by subjecting a carrier wave to FM modulation, is demodulated.

The detected base band signal 113 is inputted into an anti-alias filter 104, where high frequency elements, each higher than a half (½) of a sampling frequency fs in a digital filter 106 described later, are removed. A base band signal 114 with the high-frequency elements having been removed in the anti-alias filter 104 is inputted into a 1-bit quantizer 105 where the signal is quantized to "0" or "1".

Furthermore, quantized data 115 is inputted into the digital filter 106, where the high-frequency elements are removed. The filtered signal 116 is inputted into a digital comparator 107, where a determination is made as to whether a number of pulses at a 1/code rate [time] is less than a specified value, and is regenerated to a decoded NRZ code 117.

Thus, the conventional type of selective call receiver has a 1-bit quantizer 105 for reducing a power consumption therein and minimizing a circuit scale, and unnecessary elements are removed by the digital filter 106 from bit stream data 115 having been subjected to determination as to whether the data is "0" or "1" obtained by the 1-but quantizer 105.

Figure 6A:
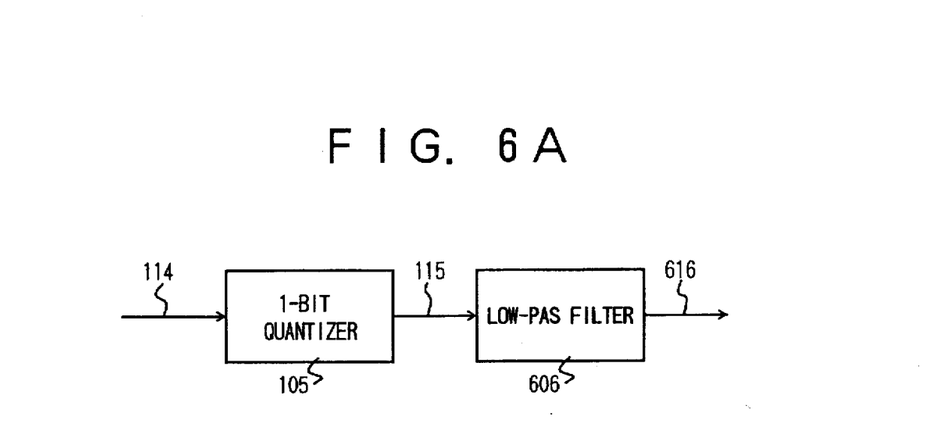
FIG. 6A is a block diagram of Example 1 based on the conventional technology.

For instance, as shown in FIG. 6A, by realizing the digital filter 106 with a moving average type of low-pass filter (MVA Low-pass filter) 606, the following approximation as expressed by the expression below can be obtained assuming that filter cut-off frequency is fc, sampling frequency is fs, and filter dimension number is N.

$$fc=0.44 \cdot fs/N \, [Hz] \quad (1)$$

For this reason, if a filter cut-off frequency fc and a sampling frequency fs are given, the filter dimension number N is automatically determined. Also, by keeping a ratio of the sampling frequency fs vs filter dimension number N fs/N at a constant value and making each value larger respectively, it is possible to make the filtering characteristics more acute, and as a result a larger filter effect can be obtained.

Namely, to improve the filter effect of the digital filter 106, it is necessary to design a circuit so that the requirements of (A) a larger dimension number of the filter, and (B) a higher sampling frequency fs, or the like will be satisfied. However, the requirements (A) and (B) are causes for a larger circuit scale and increase in power consumption, and in a case where the filter circuit is incorporated in a device requiring minimization of size thereof and reduction of power consumption such as a selective call receiver, the requirements (A) and (B) are traded off with the filter characteristics.

On the other hand, in recent years, there has been proposed the FLEX system (FLEX is a trademark for Motolora Inc.) in which selective calling is executed busing a signal with the transfer speed dynamically changing. In a communication system based on this FLEX system, transfer rates of 1600, 3200, and 6400 [bps] are allowable, and the transfer rate is dynamically changed by an earth station monitoring the transfer state. For instance, a signal is transferred at a rate of 1600 bps to an area where it is hard to receive signals, and also a signal is sent at a transfer rate of 6400 bps to an area where the signal traffic is high.

For this reason, in a selective call receiver based on this FLEX system, unless a preamble signal (sync signal) is actually received, a transfer rate for received signals is unknown. Also in the receiver, 2 types of signal for modulation speed of 1600 [baud] and 3200 [baud] respectively are to be processed, and the receiver responds to 1600 [bps] with two-valued modulation or to 3200 [bps] with four-valued modulation in a case of 1600 [baud] and to 3200 [baud] with two-valued modulated and to 6400 [bps] with four-valued modulation in a case of 3200 [baud].

Herein, it is assumed as an example that the IF/detector circuit 103 has been designed to treat signals at 3200 [baud], and that the receiver is actually receiving signals at 1600 [baud]. In this case, a pass frequency band in the IF/detector circuit 103 includes a frequency band higher than that corresponding to 1600 [baud], so that there is the high possibility that noises still remain in the high frequency band of the signals outputted from the IF/detector circuit 103.

Figure 6B:
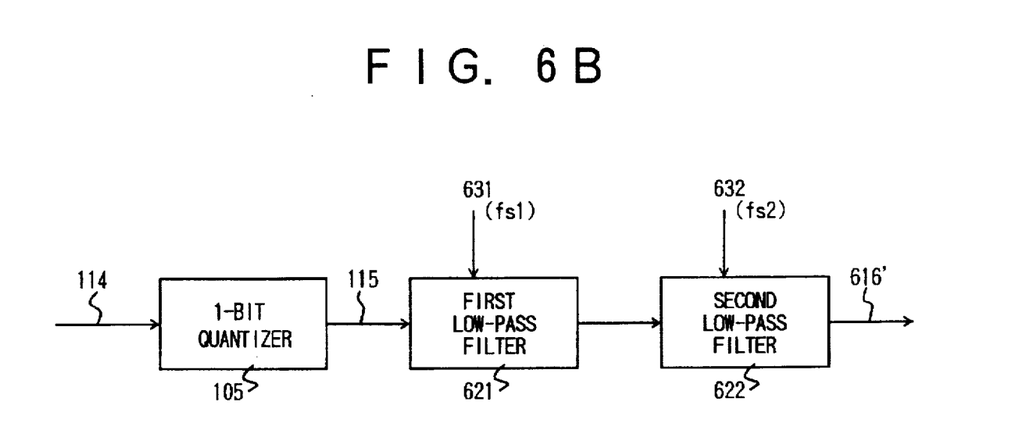
FIG. 6B is a block diagram of Example 2 based on the conventional technology.

When configuration of the filter circuit as described in Example 1 of the conventional technology is applied to the selective call receiver based on the FLEX system as described above, it is difficult to obtain the satisfying receiving characteristics. Thus, configuration of a filter circuit as shown in FIG. 6B is conceivable (Example 2 of the conventional technology).

The filter circuit as described in this example comprises a first low-pass filter 621 with a first sampling frequency fs1 as a digital filter 106 and a second low-pass filter 622 with a second sampling frequency fs2 lower than the first sampling frequency fs1. In the filter circuit, anti-alias elements in the second low-pass filter 622 each with a frequency higher than fs2/2 are removed by the first low-pass filter 621. Elements each having a frequency higher than the originally required filter cut-off frequency fc are removed by the second low-pass filter 622.

One of merits provided with the configuration as described in this example is the point that, even if a filter having a comparatively larger circuit scale is used as the second low-pass filter 622, as the sampling frequency fs2 is low, increase of power consumption in the second low-pass filter 622 can be suppressed to a certain degree.

On the other hand, in the configuration as described in this example of the conventional technology, it is necessary to make an attenuation rate in the first low-pass filter 621 relatively large, so that it is necessary to form the filter circuit with an finite impulse response filter or an infinite impulse response filter each having a coefficient. However, a multiplier is required in these types of filter, which makes the circuit scale larger and causes increase of power consumption, so that it is practically impossible to apply a filter circuit having the configuration as described above to a selective call receiver.

For this reason, a moving average type of filter or the like is used as the first low-pass filter 621, the attenuation rate is not adequate, and anti-alias elements can not be removed sufficiently when viewed from the second low-pass filter 622. As a result, it is difficult to obtain desired receiving characteristics.

As described above, in the filter circuit as described in Example 1 of the conventional technology, if a filter dimension number is made larger or a sampling frequency fs is made higher in order to obtain filter-effect, the circuit scale becomes larger with the power consumption increased. Where the filter circuit is incorporated in a device requiring minimization of a circuit and reduction of power consumption like a selective call receiver, these requirements are traded off, and it is difficult to realize a compact, low power consumption receiver with excellent receiving characteristics.

Where the filter circuit described in Example 1 is applied to a selective call receiver based on the FLEX system, it is difficult to obtain satisfactory receiving characteristics. Furthermore, if the filter circuit described in Example 2 of the conventional technology, there occur several restrictions in the filter circuit because of the requirements for minimization and reduction of power consumption. As a result, it is difficult to obtain satisfactory receiving characteristics.

SUMMARY OF THE INVENTION

It is an object of the present invention to provide a filter circuit which can suppress increase of a filter dimension number as well as increase in circuit scale even if the sampling frequency becomes higher, which can realize excellent filtering characteristics and is suited to incorporation into a device requiring minimization of the circuit as well as reduction of power consumption therein.

Another object of the present invention is to provide a filter circuit for a selective call receiver based on the FLEX system for detecting babe band signals from received signals with the transfer speed dynamically changing and decoding the transmitted data which can be formed with a smaller filter dimension number for suppressing increase in circuit scale and having the excellent filtering characteristics.

As described above, with the filter circuit according to the present invention, it is possible to suppress increase of circuit scale with increase of the filter dimension number also suppressed by using a first moving average type of filter and a second moving average type of filter even if a sampling frequency becomes high. It is possible to realize excellent filter characteristics by inserting a thinning circuit between the first moving average type of filter and the second moving average type of filter and by completely removing anti-alias elements of the second moving average type of filter which have been difficult to remove. As a result, it is possible to provide a filter circuit suitable to incorporate into a device which requires size reduction of the device and reduction of power consumption.

With the filter circuit according to the present invention, in the filter circuit for a selective call receiver, it is possible to suppress increase of circuit scale with increase of a filter dimension number also suppressed by using the first moving average type of filter and the second moving average type of filter even if a sampling frequency becomes high. It is possible to provide a filter circuit having excellent filter characteristics by inserting the thinning circuit between the first moving average type of filter and the second moving average type of filter and by completely removing anti-alias elements of the second moving average type of filter which have been difficult to be removed. As a result, it is possible to provide a filter circuit suitably enabling achievement of size reduction of a selective call receiver and reduction of power consumption.

With the filter circuit according to the present invention, especially, by applying the filter circuit according to the second feature to, for instance, a filter circuit for a selective call receiver based on the FLEX system in which a transfer speed of a received signal is dynamically changed, it is possible to completely remove any noise in a high frequency band which may remain in the detected base band signal. It is also possible to realize a selective call receiver having excellent receiving characteristics.

With the filter circuit according to the present invention, as a pass band of the received base band signal can be changed by changing the first sampling frequency as well as the second sampling frequency, in a case where the selective call receiver according to the present invention is used also in the received area in which a code rate is different, it is possible to easily switch a cut-off frequency of the filter by a switching means provided in the main body of receiver. This makes it possible to realize a selective call receiver enabling good response to a change of the code rate.

With the filter circuit according to the present invention, when the first sampling frequency is P times the second sampling frequency, the thinning circuit sums P pieces of output from the first moving average type of filter processed according to each from a current pulse to a pulse P−1 pieces before the current pulse of a clock of the first sampling frequency and outputs in synchronism to a clock of the second sampling frequency. Hence, it is possible to provide a filter circuit enabling suppression of further increase of circuit scale.

With the filter circuit according to the present invention, when the first sampling frequency is P times the second sampling frequency, the thinning circuit sums p pieces of output from the first moving average type of filter processed according to each from a current pulse to a pulse p−1 pieces before the current pulse of a clock of the first sampling frequency in synchronism to a clock of the second sampling frequency, divides a result of the computing with a value p, and outputs the quotient. This makes it possible to provide a filter circuit enabling realization thereof in which increase of circuit scale can be suppressed.

Other objects and features of this invention will become understood from the following description with reference to the accompanying drawings.

BRIEF DESCRIPTION OF THE DRAWINGS

FIGS. 2A to 2C are views for detailed explanation of a thinning circuit according to the embodiment.

FIGS. 4A to 4C are explanatory views of operations in the embodiment.

FIGS. 6A and 6B are block diagram showing a conventional type of digital filter.

DETAILED DESCRIPTION OF THE EMBODIMENTS

Next, a detailed description is made for outline of the filter circuit according to the present invention as well as for embodiments of the filter circuit according to the present invention with reference to the related drawings in the order of Embodiment 1 and Embodiment 2.

Figure 1B:
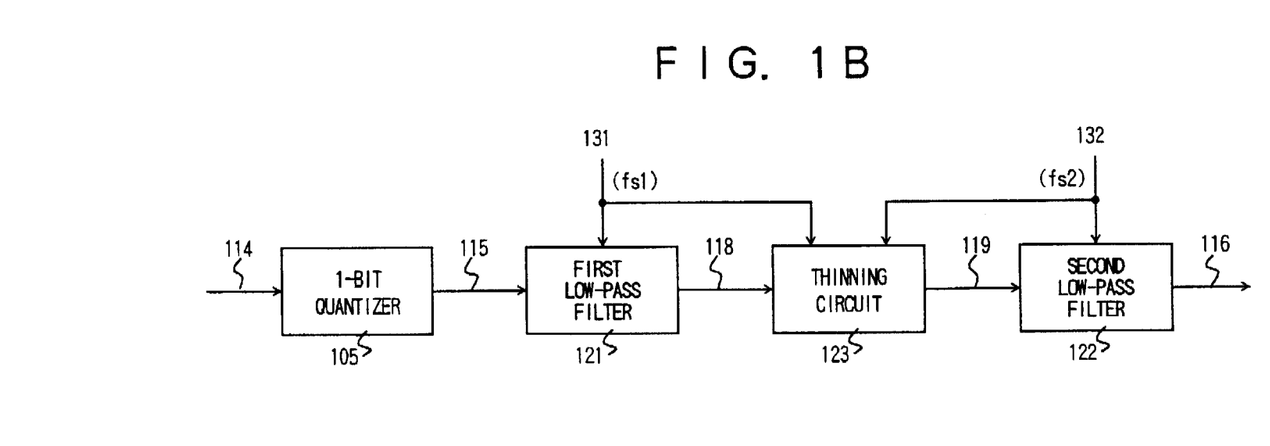
FIG. 1B is a block diagram showing the filter circuit.

In the filter circuit according to the first feature of the present invention, as shown in FIG. 1B, in the first moving average type of filter 121, the 1-bit quantized signal 115 is loaded to an N-dimensional 1-bit delay element executing sequential operations in synchronism to the clock 131 of the first sampling frequency fs1, where anti-alias elements are in the second moving average type filter 122. Namely, signal elements each having a frequency higher than one-half of the second sampling frequency fs2/2 are removed. However, in the moving average type of filter, it is difficult to completely remove the anti-alias elements, and an output 118 from the first moving average type of filter 121 is thinned by the thinning circuit 123 in synchronism to a clock 132 of the second sampling frequency fs2 to completely remove anti-alias elements in the second moving average type of filter 122. Furthermore, in the second moving average type of filter 122, an output 119 from the thinning circuit 123 is loaded to an M-order q-bit delay element executing sequential operations in synchronism to a clock 132 of the second sampling frequency fs2, and elements each having a frequency higher than the cut-off frequency fc originally required in the filter circuit are removed.

As described above, by using the first moving average type of filter 121 and the second moving average type of filter 122, even if sampling frequency becomes higher, it is possible to suppress increase in circuit scale by forming a filter circuit suppressing increase in filter dimension number. By inserting the thinning circuit between the first moving average type of filter 121 and the second moving average type of filter 122, it is possible to realize excellent filtering characteristics by completely removing anti-alias elements in the second moving average type of filter 122, which has been difficult in the conventional technology. As a result, it is possible to realize a filter circuit suited to incorporation into a device requiring minimization and reduction of power consumption.

In the filter circuit according to the second feature of the present invention for a selective call receiver for detecting base band signals from received signals and decoding transmitted data, in the first moving average type of filter 121, the signal 115 1-bit quantized by the 1-but quantizer 105 is loaded to an N-dimensional 1-bit delay element executing sequential operations in synchronism to a clock 131 of the first sampling frequency fs1, where anti-alias elements are in the second moving average type of filter 122. Namely, signal elements each having a frequency higher than one-half of the second sampling frequency fs2/2, are removed. However, complete removal of anti-alias elements in a moving average type of filter is difficult, so that an output 118 from the first moving average type of filter 121 is thinned by the thinning circuit in synchronism to a clock 132 of the second sampling frequency fs2, and anti-alias elements in the second moving average type of filter 122 are completely removed. Furthermore, in the second moving average type of filter 122, an output 119 from the thinning circuit 123 is loaded to an M-order q-bit delay element executing sequential operations in synchronism to a clock 132 of the second sampling frequency fs2, where elements each having a frequency higher than the cut-off frequency fc originally required to the filter circuit are removed.

Thus in a filter circuit for a selective call receiver, by using the first moving average type of filter 121 and the second moving average type of filter 122, it is possible to suppress increase of a circuit scale by forming a filter circuit suppressing increase of a filter dimension number even if sampling frequency becomes higher. By inserting the thinning circuit 123 to between the first moving average type of filter 121 and the second moving average type of filter 122, it is possible to realize a filter circuit having excellent filtering characteristics by completely removing anti-alias elements in the second moving average type of filter 122, which has been difficult in the conventional technology. As a result, it becomes possible to minimize size of and reduce power consumption in a selective call receiver in which the filter circuit is incorporated.

In the filter circuit according to the third feature of the present invention, in which a transfer speed of received signals dynamically changes, for a selective call receiver based on the FLEX system, by applying the filter circuit according to the second feature of the present invention, it is possible to realize a selective call receiver having excellent receiving characteristics which can completely remove noise in a high frequency band which may remain in the detected base band signals independently of the transfer rate.

In the filter circuit according to the fourth feature of the present invention, by changing the first sampling frequency fs1 and the second sampling frequency fs2, a pass band for received base band signals can be changed. In a case where a selective call receiver according to the present invention is used also in a receiving area with a different code rate, it is possible to easily change cut-off frequency in a filter with a switching means or the like provided in a basic system of the receiver. Hence, it is possible to realize a selective call receiver which can flexibly respond to change in a code rate.

In the filter circuit according to the fifth feature of the present invention, when the relation that the first sampling frequency fs1 is p times the second sampling frequency fs2 (fs1=p×fs2) is satisfied, in the thinning circuit 123, p pieces of output from the first moving average type of filter 121 having been processed by each of the pulses from the current pulse in the clock 131 of the first sampling frequency fs1 up to p−1 pieces before are added in synchronism to a clock of the second sampling frequency fs, and the sum is outputted. The filter circuit is realized with a simple summing type of filter configuration comprising, for instance, p−1 pieces of registers and p pieces of input adders, so that it becomes possible to realize a filter circuit which can furthermore suppress increase of circuit scale.

Furthermore, in the filter circuit according to the sixth feature of the present invention, when the relation that the first sampling frequency fs1 is p times of the second sampling frequency fs2 (fs1=p×fs2) is satisfied, in the thinning circuit 123, p pieces of output from the first moving average type of filter 121 having been processed by each of the pulses from the current pulse of the clock 131 of the first sampling frequency up to that p−1 pieces before are summed up in synchronism to the second sampling frequency fs2. The sum is divided by a value p and the quotient is outputted. Hence, a simple adding average type of filter configuration comprising, for instance, p−1 pieces of register and p pieces of input adder and dividers and a filter circuit which can suppress increase of circuit scale, can be realized.

FIG. 1A is a block diagram showing a selective call receiver in which a filter circuit according to Embodiment 1 of the present invention is applied, and FIG. 1B is a block diagram showing a filter circuit. The configuration shown in FIG. 1A is substantially the same as Example 1 of the conventional technology, but configuration of a digital filter 106 shown in FIG. 1B is different from that in Example 1 based thereon.

In FIG. 1A, in the selective call receiver, a in-coming waveform is received by an antenna 101, and is amplified to a high frequency wave by an RF amplifier 102. Further, the RF amplification signal is subjected to a frequency conversion to an intermediate frequency band signal by an IF/detector circuit, and the base band signal generated by subjecting a carrier wave to FM-modulation is detected.

The detected base band signal 113 is inputted into an anti-alias filter 104, and an anti-alias element (namely, an element having a frequency element higher than one-half of a sampling frequency) in the digital filter 106 described later can be removed. Then a base band signal 114 in which a high frequency element is removed by the anti-alias filter 104 is inputted into a 1-bit quantizer 105, and is quantized to "0" or "1".

Furthermore, the quantized data 115 is inputted into the digital filter 106, and a high frequency element is removed. The filtered signal 116 is inputted into a digital comparator 107, determination is made as to whether a number of pulses in 1/coding rate [time] is less than a specified value or not, and NRZ codes are regenerated to the coding 117.

In FIG. 1B, the digital filter 106 (filter circuit) according to the embodiment comprises a first low-pass filter 121 (a first moving average type of filter) for receiving a signal 115 subjected to 1-bit quantization by the 1-bit quantizer 105 and having an N-dimensional 1-bit delay element executing sequential operations in synchronism to a clock 131 of the first sampling frequency fs1; a thinning circuit 123 for subjecting an output 118 from the first low-pass filter 121 to a thinning processing in synchronism to a clock 132 of the second sampling frequency fs2, and a second low-pass filter 122 (second moving average type of filter) for receiving an output 119 from the thinning circuit 123 and having an M-order q-bit delay element executing sequential operations in synchronism to a clock 132 of the second sampling frequency fs2.

In the first low-pass filter 121, an anti-alias element in the second low pass filter 122, namely a signal element having a frequency higher than one-half of frequency of fs2/2 of the second sampling frequency is removed. However, it is difficult to completely remove the element because it is a moving average type of filter, so that an output 118 from the first low-pass filter 121 is subjected to a thinning process by the thinning circuit 123, and the anti-alias element of the second low-pass filter 122 is completely removed. Furthermore, in the second low-pass filter 122, elements each having a frequency higher than cut-off frequency fc by nature required in the digital filter 106 is removed from the output 119 from the thinning circuit 123.

Figure 2A:
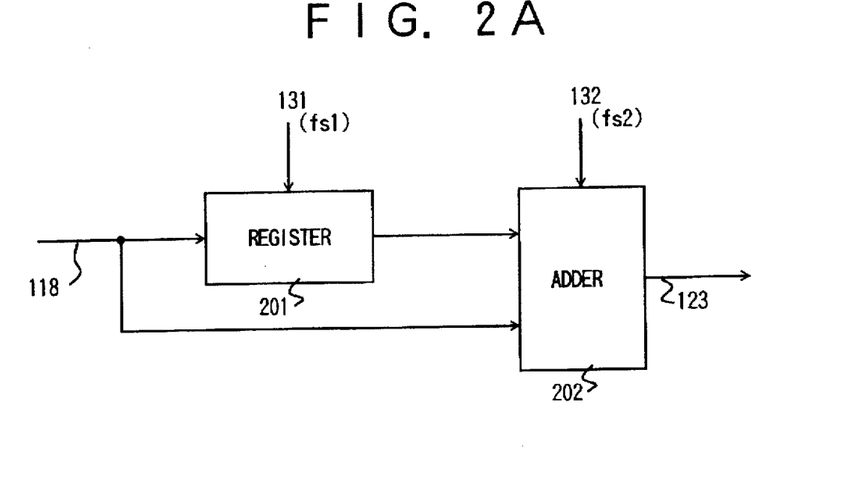
FIG. 2A is a block diagram showing a first example of the thinning circuit.
Figure 2B:
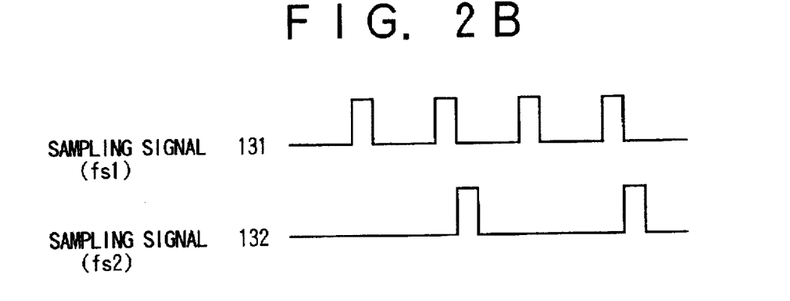
FIG. 2B is an explanatory view of a relation between a first sampling frequency and a second sampling frequency.
Figure 2C:
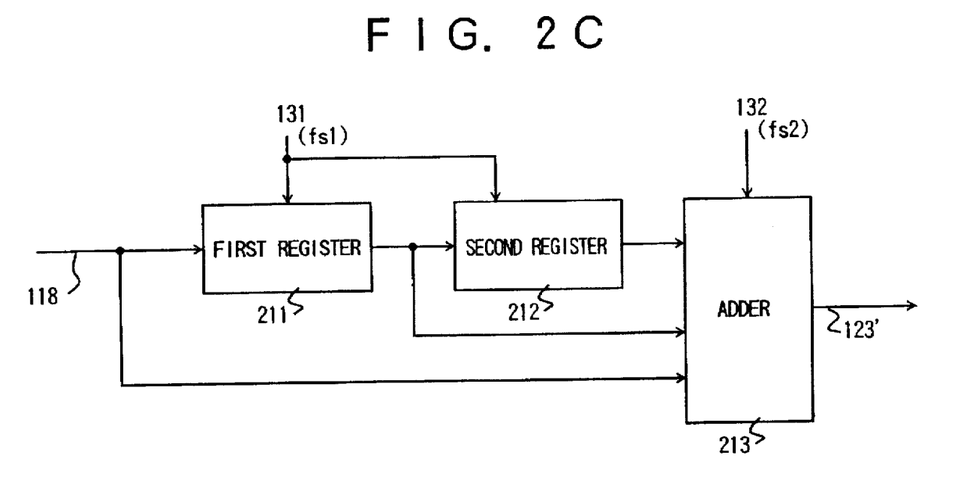
FIG. 2C is a block diagram showing a second example of the thinning circuit.

FIGS. 2A to 2C are views for explanation of detailed configuration of a thinning circuit 123 according to the embodiment. As shown in FIG. 2B, when the first sampling frequency fs1 is 2 times of the second sampling frequency fs2 (fs1=2×fs2), the thinning circuit 123 can comprise, as shown in FIG. 2A, an adding type of filter having a q-bit register 201 as well as a q-bit 2 input adder 202. Herein, q indicates a number of bit which can be processed by 1 cycle of the first sampling frequency fs1.

The register 201 is set according to a clock 131 of the first sampling frequency fs1, so that an output from the first low-pass filter 121 processed by the current pulse of the clock 131 of the first sampling frequency fs1 and an output from the second low-pass filter 121 processed by the pulse by 1 piece of the current pulse thereof are supplied to the 2 input adder 202. The 2 input adder 202 sums the two values in synchronism to the clock of the second sampling frequency fs2. With this feature, signal elements each having a frequency higher than a half frequency fs2/2 of the second sampling frequency included in the output from the first low-pass filter 121 can be removed.

In the thinning circuit 123 in FIG. 2A, a divider which converts an inputted value to ½, namely an adding average type of filter may be provided in the output side of the 2 input adder 202. In this case, particular hardware is not required because computing for dividing a value by 2 takes place, which means that only the thing to be done is to remove the lowest bit.

When the first sampling frequency fs1 is 3 times of the second sampling frequency fs2 (fs1=3×fs2), the thinning circuit 123 can comprise, as shown in FIG. 2C, a adding type of filter having a first register 211, a second register 212, and a 3 input adder 213.

As the first register 211 and the second register 212 are set according to a clock 131 of the first sampling frequency fs1, an output from the first low-pass filter 121 processed by the current pulse of the clock 131 of the first sampling frequency fs1 and an output from the first low-pass filter 121 processed by each of the pulses by 1 piece or 2 pieces before the current pulse thereof respectively are supplied to an input of the 3 input adder 213. The 3 input adder 213 sums these three values in synchronism to a clock of the second sampling frequency fs2.

As for the configuration shown in FIG. 2C, a divider which converts an input value to ⅓, namely an adding average type filter may be provided in the output side of the 3 input adder 213.

As described above, the thinning circuit 123 can be realized with a simple adding type of filter or an adding average type of filter comprising a resister, an adder and/or a divider, so that it is possible to realize a digital filter 106 which can suppress increase of circuit scale.

Figure 3:
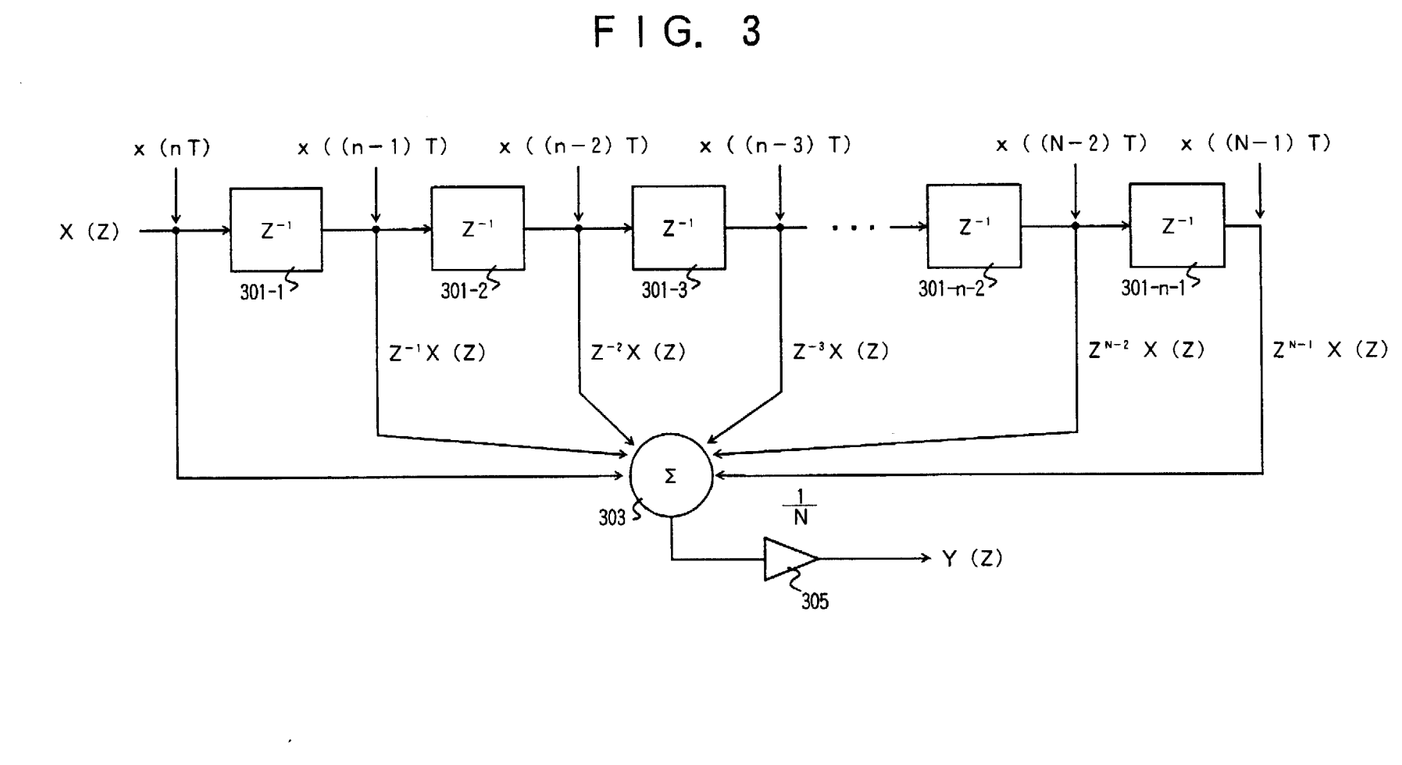
FIG. 3 is a flow chart showing a signal of a moving average type filter used for a low-pass filter as well as for a second low-pass filter.

FIG. 3 shows a signal flow chart showing in an average type of filter used in the first low-pass filter 121 and the second low-pass filter 122.

It should be noted that a filter having a 1-bit width is used for the first low-pass filter 121, and a filter having a q-bit width in the second low-pass filter 122 respectively. FIG. 3 corresponds to the first low-pass filter 121, and it is assumed herein that an N-dimensional 1-bit delay element executing sequential operations in synchronism to the clock 131 of the first sampling frequency fs1 is provided therein.

In FIG. 3, outputs from each of delay elements 301-1 to 301-n-1 are added to an input X (Z) by an adder 303, and an adding average which is set to 1/N by a divider 305 becomes an output Y (Z) from the first low-pass filter 121. However, the quantized data 115 is 1-bit data, so that each of the delay elements 301-1 to 301-n-1 can comprise a simple 1-bit shift register, and a sum of outputs from each of the delay elements 301-1 to 301-n-1 can be obtained by the adder 303 having simple configuration. Further, into each of the delay elements 301-1 to 301-n-1, the clock 131 of the first sampling frequency fs1 is inputted, so that delaying time can be adjusted.

Similarly, the second low-pass filter 122 can comprise an M-order q-bit delay element, a q-bit M input adder, and a 1/M divider, and the same operations as those described above are executed.

Figure 4A:
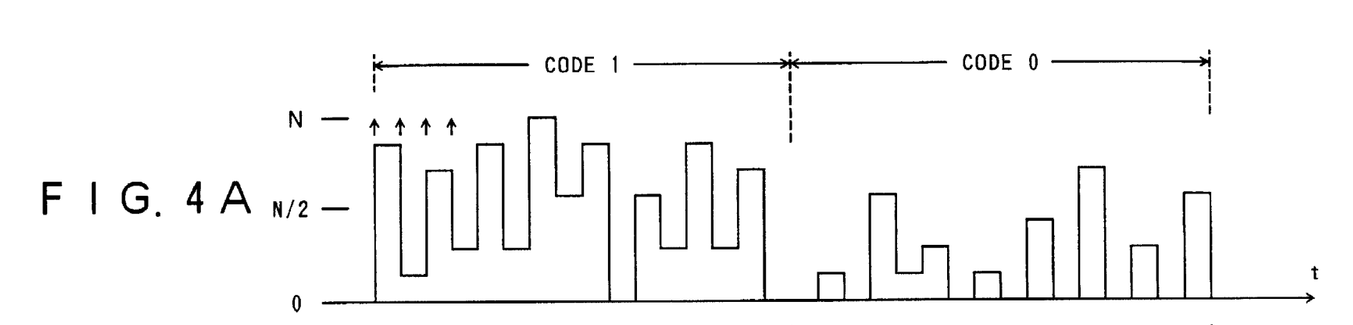
FIG. 4A is a signal waveform of an output from the first low-pass filter.
Figure 4B:
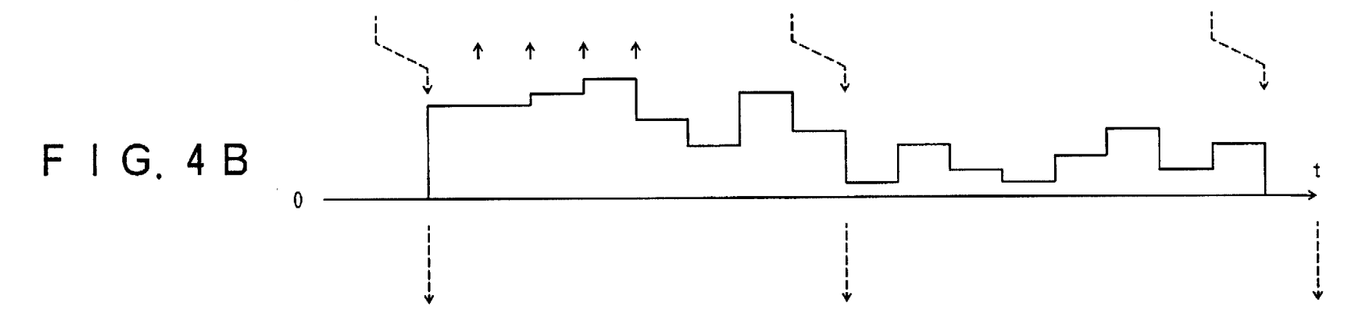
FIG. 4B is a signal waveform of an output from the thinning circuit.
Figure 4C:
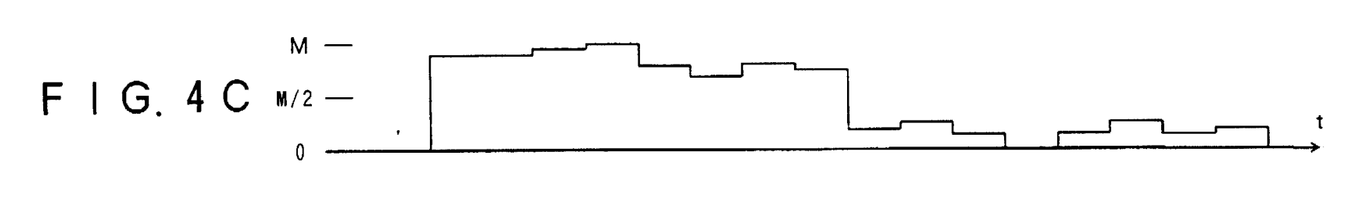
FIG. 4C is a signal waveform of an output from the second low-pass filter.

Description is made for the fact that anti-alias element of the second low-pass filter 122 can be removed by means of the selective call receiver according to the embodiment, which has been difficult in the conventional technology, with reference to an explanatory view of operations thereof in FIGS. 4A to 4C.

In a signal 115 subjected to 1-bit quantization by the 1-bit quantizer 105, noise elements are removed by a first low-pass filter 621 shown in an example of the conventional technology (Refer to FIG. 6). But as described above, there have been many cases in which satisfactory characteristics can not be obtained.

FIGS. 4A to 4C are explanatory views of operations in the embodiment, and FIG. 4A is a view showing a signal waveform of an output 118 from the first low-pass filter 121; FIG. 4B is a view showing that of an output 119 from the thinning circuit 123; and FIG. 4C is a view showing that of an output 116 from the second low-pass filter 122. It should be noted that in the concrete examples in FIGS. 4A to 4C, a relation between the first sampling frequency fs1 and the second sampling frequency fs2 is as follows: fs2=2×fs1, and the configuration of thinning circuit 123 is as shown in FIG. 2A.

At first in FIG. 4A, an output 118 from the first low-pass filter 121 is an N-dimensional filter output, so that a noise element with a frequency fs1/2 remains, and each value of the outputs takes each value in a range from 0 to N. Herein, assuming that a level N/2 is a center threshold value and determination for [0, 1] is made, as clearly understood from the figure, it is impossible to obtain a correct result of the determination.

In this embodiment, as shown in FIG. 4B, an output 118 from the first low-pass filter 121 is subjected to adding averaging by the sampling frequency fs2 in the thinning circuit 123, and the second low-pass filter 122 receives an output 119 from the thinning circuit 123. The waveform shown in FIG. 4B shows only one-half of a value obtained by summing up the two values adjacent to each other in FIG. 4A, and as understood from FIG. 4B showing the result, signal elements each having a frequency of fs1/2 included in the output 118 of the first low-pass filter 121 becomes signal elements of a frequency fs2/2.

Then, when an output 119 from the thinning circuit 123 is inputted into the M-order second low-pass filter 122, the signal waveform shown in FIG. 4C can be obtained. Namely, in the signal waveform in FIG. 4C, in a case where M/2 is a center threshold value, determination for [0, 1] can accurately be executed. In other words, it is possible to remove anti-alias elements of the second low-pass filter 122 by inserting the thinning circuit 123 in which an adding average is computed by the second sampling frequency fs2 between the first low-pass filter 121 and the second low-pass filter 122.

As described above, in the filter circuit for a selective call receiver according to the embodiment, by using a moving average type of filter for the first low-pass filter 121 and second low-pass filter 122, a filter circuit comprises a filter in which an increase of a number of dimension thereof is suppressed, which makes it possible to suppress an increase of a circuit size even if a sampling frequency becomes high, and by inserting the thinning circuit 123 between the first low-pass filter 121 and the second low-pass filter 122, removal of the anti-alias element of the second low-pass filter 122 which has been difficult to be removed is completely executed, which makes it possible to realize a filter circuit having the excellent filtering characteristics. As a result, it is possible to reduce a size of a selective call receiver as well as to reduce power consumption.

If a clock 131 of the first sampling frequency fs1 and a clock 132 of the second sampling frequency fs2 are selectively generated by, for instance, previously preparing a pair of oscillators each having a different oscillating frequency from each other and by switching the pair according to a control by a CPU or the like, a pass band for received base band signals can be changed, and a cut-off frequency of the filter circuit can easily be changed by means of switching control of the CPU even in a received area in which a code rate is different, so that it is possible to realize a selective call receiver enabling flexible correspondence to a change of code rate.

In Embodiment 2 according to the present invention, and the filter circuit according to the present invention is applied to, for instance, a filter circuit of a selective call receiver based on the FLEX system in which a transfer speed of received signals changes dynamically.

Figure 5A:
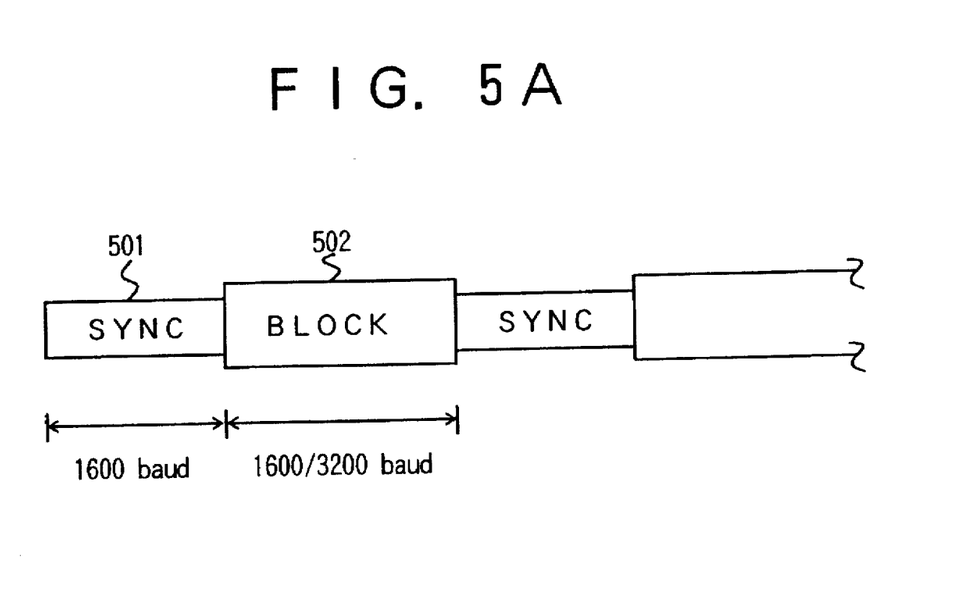
FIG. 5A is a block diagram showing a frame of a transfer signal based on a FLEX system according to Embodiment 2.
Figure 5B:
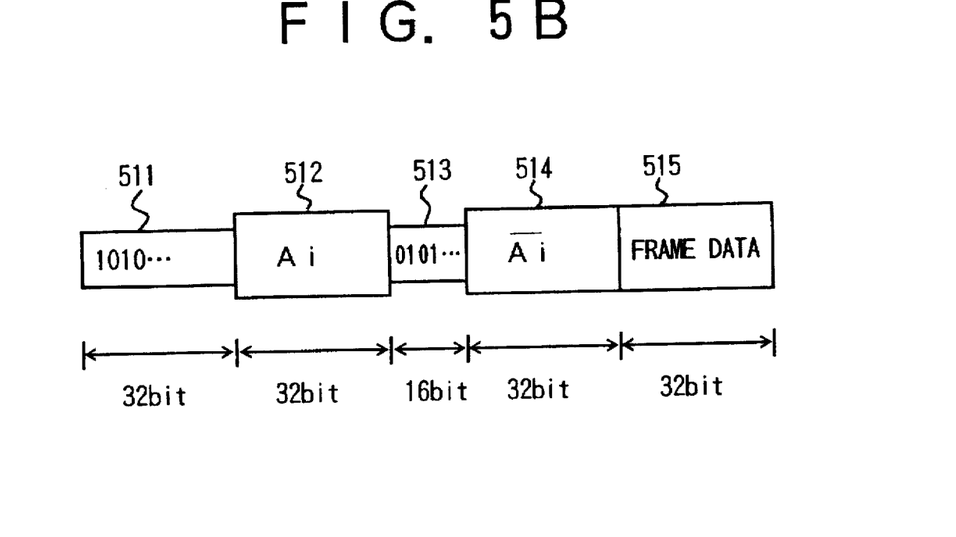
FIG. 5B is a block diagram showing a synchronizing section.

In this FLEX system, a transfer rate such as 1600, 3200, and 6400 [bps] can be used, and a base station can dynamically change a transfer rate while monitoring the transferring conditions. FIGS. 5A and 5B show frame configurations of a transfer signal based on the FLEX system.

As shown in FIG. 5A, a 1-frame transfer signal comprises a synchronized section 501 transferred at 1600 [baud] and a data block section 502 transferred at 1600 or 3200 [baud]. It should be noted that a period of time required for transferring 1 frame is fixed to 1.875 [sec], and for this reason, a rate of transferred data included in the data block section 502 is changed according to a change of the transfer rate.

FIG. 5B shows configuration of the synchronized section 501. Identification is made by identifying sections 512 (32-bit data Ai) and 514 (Inversion of 32-bit data Ai) isolated by a 0, 1 bit stream 513 of 16-bit as to whether a modulation is executed by means of binary modulation or four-value modulation, and also as to whether a transfer rate is 1600 [baud] or 3200 [baud]. Herein, in 32-bit data Ai, types of i=0 to 7 are prepared according to combinations of the identification described above. Also frame data 515 is for identifying other data in the frame.

The configuration of the selective call receiver according to the embodiment is the same as that in Embodiment 1, and the configuration shown in FIGS. 1A and 1B is used. For generation of a basic clock to generate a clock 131 of the first sampling frequency fs1 and a clock 132 of the second sampling frequency fs2, for instance, an oscillator having an oscillating frequency of 76.8 [kHz] is prepared.

When transfer rate is 1600 [baud], a clock 131 of the first sampling frequency (fs1=25.6 [kHz]) can be obtained by dividing the basic clock by 3, while a clock 132 of the second sampling frequency (fs2=12.8 [kHz]) is obtained by dividing the clock 131 by 2. When a transfer rate is 3200

[baud], the clock 131 of the first sampling frequency (fs1=38.4 [kHz]) is obtained by dividing the basic clock by 2, and the clock 132 of the second sampling frequency (fs2=19.2 [kHz] is obtained by dividing the clock 131 by 2.

A cut-off frequency fc is around 800 [Hz] when the transfer rate is 1600 [baud], and is around 1600 [Hz] when the transfer rate is 3200 [baud].

Furthermore, a filter dimension number in the first low-pass filter 121 is 14 when the transfer rate is 1600 [baud], and 10 when the transfer rate is 3200 [baud], and a filter dimension number in the second low-pass filter 122 is 5 when the transfer rate is 1600 [baud], and 4 when the transfer rate is 3200 [baud].

In addition, to generate sampling frequencies fs1 and fs2, a switching control of the dividing ratio described above taking place depending on a difference of the transfer rate is executed according to identification of the 32-bit data Ai by the CPU.

As described above, a digital filter 106 having the configuration shown in FIG. 1B is applied to a filter circuit of a selective call receiver based on the FLEX system, so that any noise in high frequency band which may remain in the detected base band signal can be completely removed, and for this reason it is possible to realize a selective call receiver having excellent receiving characteristics.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A filter circuit comprising:
 a first moving average type of filter having an N-dimensional 1-bit delay element (N; A positive integer) receiving a 1-bit quantized signal and executing sequential operations in synchronism to a clock of a first sampling frequency;
 a thinning circuit for thinning an output from said first moving average type of filter in synchronism to a clock of a second sampling frequency; and
 a second moving average type of filter having an M-order q-bit delay element (M, q: Positive integers) receiving an output from said thinning circuit and executing sequential operations in synchronism to a clock of said second sampling frequency;
 wherein said thinning circuit removes anti-alias elements of said second moving average type of filter, namely signal elements each having a frequency higher than a half of said second sampling frequency.

2. A filter circuit according to claim 1; wherein, when said first sampling frequency is P times (P: positive integer) said second sampling frequency, said thinning circuit sums p pieces of output from said first moving average type of filter processed according to each of the pulses from a current pulse to a pulse by p−1 pieces before the current pulse of a clock of said first sampling frequency and outputs the sum in synchronism to a clock of said second sampling frequency.

3. A filter circuit according to claim 1, wherein, when said first sampling frequency is p times (p: Positive integer) second sampling frequency, said thinning circuit sums p pieces of output from said first moving average type of filter processed according each of the pulses from a current pulse to a pulse by p−1 pieces before the current pulse of a clock of said first sampling frequency in synchronism to a clock of said second sampling frequency, divides a result of said computing with a value p, and outputs the quotient.

4. A filter circuit for a selective call receiver for detecting a base band signal from a received signal and decoding transmitted data comprising:
 a 1-bit quantizer for subjecting said base band signal to 1-bit quantization;
 a first moving average type of filter having an N-dimensional 1-bit delay element (N: Positive integer) receiving an output from said 1-bit quantizer and executing sequential operations in synchronism to a clock of the first sampling frequency;
 a thinning circuit for subjecting an output from said first moving average type of filter to a thinning processing in synchronism to a clock of the second sampling frequency; and
 a second moving average type of filter having an M-order q-bit delay element (M, q: Positive integers) receiving an output from said thinning circuit and executing sequential operations in synchronism to a clock of the second sampling frequency;
 wherein said thinning circuit removes anti-alias elements of said second moving average type of filter, namely signal elements each having a frequency higher than one-half of said second sampling frequency.

5. A filter circuit according to claim 4, wherein, when said first sampling frequency is P times (P: positive integer) said second sampling frequency, said thinning circuit sums p pieces of output from said first moving average type of filter processed according to each of the pulses from a current pulse to a pulse by p−1 pieces before the current pulse of a clock of said first sampling frequency and outputs the sum in synchronism to a clock of said second sampling frequency.

6. A filter circuit according to claim 4, wherein, when said first sampling frequency is p times (p: Positive integer) said second sampling frequency, said thinning circuit sums p pieces of output from said first moving average type of filter processed according each of the pulses from a current pulse to a pulse by p−1 pieces before the current pulse of a clock of said firs sampling frequency in synchronism to a clock of said second sampling frequency, divides a result of said computing with a value p, and outputs the quotient.

7. A filter circuit according to claim 4, where a transfer speed of said received signal changes dynamically.

8. A filter circuit according to claim 4, wherein a pass band for said received base band signal can be changed by changing said first sampling frequency and said second sampling frequency.

9. A digital filter system comprising:
 a first low-pass filter responsive to a digital input signal for forming a first filtered signal and having a first delay element controlled by a first clock signal at first sampling frequency for sequentially delaying said input signal in synchronism with said first clock signal;
 a thinning circuit coupled to said first low-pass filter ad having at least one register circuit controlled by said first clock signal for producing a sample of said first filtered signal in synchronism with said first clock signal, and an adder controlled by a second clock signal at second sampling frequency for summing said first filtered signal with said produced sample in synchronism with said second clock signal; and a second low-pass filter coupled to said thinning circuit and having a second delay element for sequentially delaying an output signal of said adder in synchronism with said second clock signal.

10. The filter system of claim 9, wherein said first and second low-pass filters are filters of a moving average type.

11. The filter system of claim 9, wherein the number of samples supplied to inputs of said adder depends on the ratio of said second sampling frequency to said first sampling frequency.

12. The filter system of claim 9, wherein the adder has two inputs when the first sampling frequency is twice as high as the second sampling frequency.

13. The filter system of claim 12, wherein said thinning circuit comprises a single register circuit for producing a single sample of said first filtered signal.

14. The filter system of claim 11, wherein the adder has three inputs when the first sampling frequency is thrice as high as the second sampling frequency.

15. The filter of claim 14, wherein said thinning circuit comprises two register circuits for producing two samples of said first filtered signal.

* * * * *